(12) United States Patent
Budde

(10) Patent No.: US 6,522,624 B2
(45) Date of Patent: Feb. 18, 2003

(54) ATTACHMENT AND MICROACTUATION AIDS IN A LAMINATED SUSPENSION

(75) Inventor: Richard A. Budde, Plymouth, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/059,600

(22) Filed: Jan. 29, 2002

(65) Prior Publication Data

US 2002/0163763 A1 Nov. 7, 2002

Related U.S. Application Data

(60) Provisional application No. 60/288,343, filed on May 3, 2001.

(51) Int. Cl.⁷ .............................................. G11B 21/24
(52) U.S. Cl. .................................................. 369/294.3
(58) Field of Search ........................... 360/294.3–294.5

(56) References Cited

U.S. PATENT DOCUMENTS

| | | |
|---|---|---|
| 4,670,804 A | 6/1987 | Kant et al. |
| 4,760,478 A | 7/1988 | Pal et al. |
| 4,991,045 A | 2/1991 | Oberg |
| 4,996,623 A | 2/1991 | Erpelding et al. |
| 5,282,103 A | 1/1994 | Hatch et al. |
| 5,296,983 A | 3/1994 | Blanc et al. |
| 5,408,372 A | 4/1995 | Karam, II |
| 5,594,607 A | 1/1997 | Erpelding et al. |
| 5,764,444 A * | 6/1998 | Imamura et al. ......... 360/294.4 |
| 5,771,135 A | 6/1998 | Ruiz et al. |
| 5,793,569 A | 8/1998 | Christianson et al. |
| 5,875,071 A | 2/1999 | Erpelding et al. |
| 5,875,072 A | 2/1999 | Brooks, Jr. et al. |
| 5,955,176 A | 9/1999 | Erpelding et al. |
| 5,978,178 A | 11/1999 | Adley |
| 6,157,522 A * | 12/2000 | Murphy et al. .......... 360/294.4 |
| 6,351,348 B1 | 2/2002 | Erpelding et al. |

FOREIGN PATENT DOCUMENTS

| | | |
|---|---|---|
| EP | 0617 411 A2 | 3/1993 |
| WO | WO 01/14766 A1 | 3/2001 |

* cited by examiner

*Primary Examiner*—Allen Cao
(74) *Attorney, Agent, or Firm*—Theodore M. Magee; Westman, Champlin & Kelly, P.A.

(57) ABSTRACT

A laminated suspension includes recesses in one layer of the suspension that aid in attaching elements to the suspension and in utilizing a micromotor placed on the suspension. In particular, examples of the recesses include weld areas for welding the suspension to other items, fiducials that are used to align the suspension with other items, micromotor recesses that receive the micromotors, adhesive controls that restrict the location of adhesives on the suspension, electrical interconnect attachment tabs that accept flex electrical circuits, side rails that reduce torsional resonance during microactuation and microactuator hinges that reduce the force needed for microactuation. In addition, a laminated suspension with a single metal layer in the spring area is provided.

29 Claims, 7 Drawing Sheets

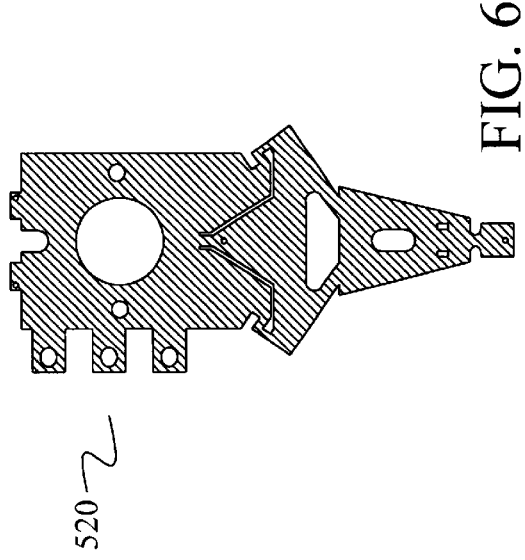
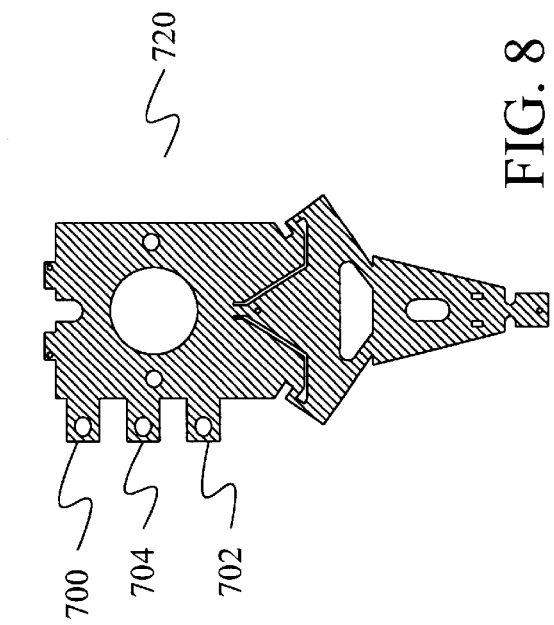
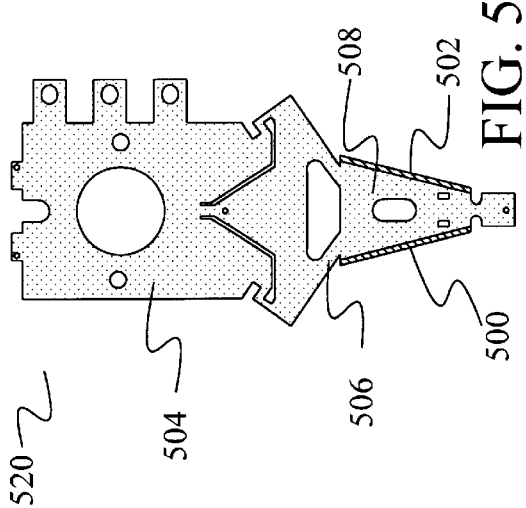

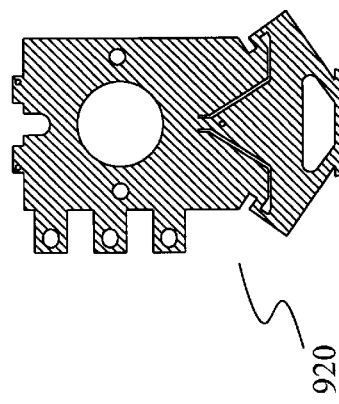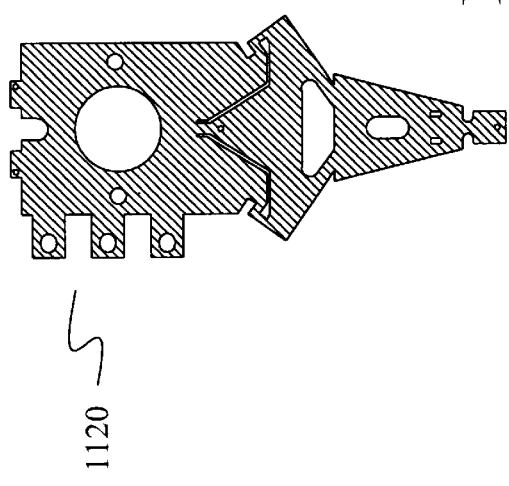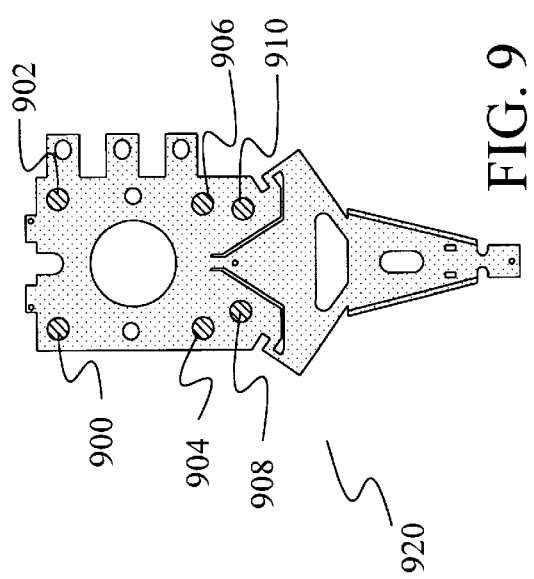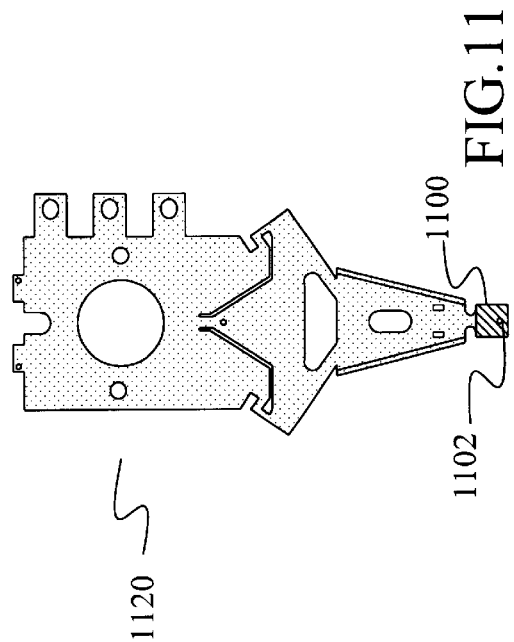

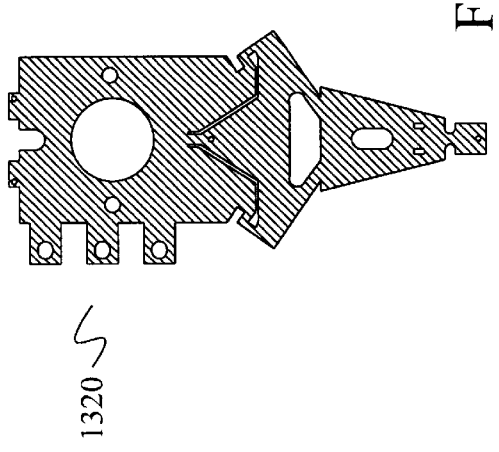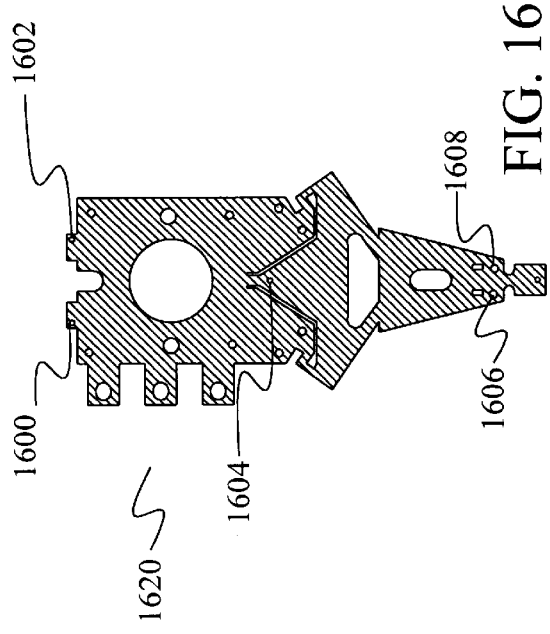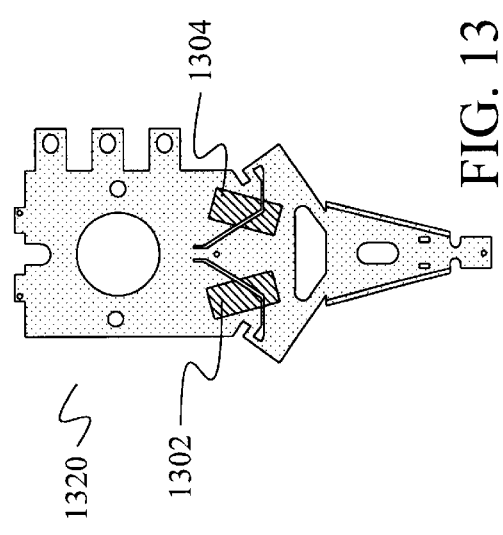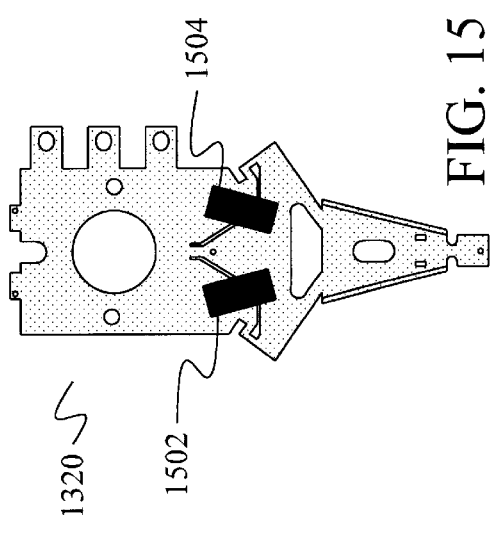
FIG. 13
FIG. 14
FIG. 15
FIG. 16

ATTACHMENT AND MICROACTUATION AIDS IN A LAMINATED SUSPENSION

CROSS-REFERENCE TO RELATED APPLICATION

This application claims priority from U.S. Provisional application No. 60/288,343 filed on May 3, 2001 and entitled LAMINATED LOADBEAM FOR MICROACTUATION.

FIELD OF THE INVENTION

The present invention relates to storage devices. In particular, the present invention relates to suspension assemblies in storage devices.

BACKGROUND OF THE INVENTION

In data storage devices, data is typically stored in tracks on a medium. To access the data, a head is positioned within a track while the medium moves beneath the head.

In many data storage devices, the head is positioned by an actuator assembly that includes a motor that rotates one or more actuator arms. Each actuator arm supports one or two suspensions that each support a head/gimbal assembly. Typically, a suspension includes three distinct areas: a base plate area that connects to the actuator arm, a spring area that provides a vertical spring force to bias the head toward the medium, and a load beam that extends from the spring area to the head/gimbal assembly. The spring force provided by the suspension is designed to allow the head to follow height variations on the surface of the medium without impacting the medium or moving too far away from the medium.

In the past, suspensions have typically been formed from sheets of stainless steel. In some prior art systems, using sheets of stainless steel results in a suspension in which the spring area and the load beam are the same thickness. Because of this, both areas exhibit similar mechanical properties. However, because the spring area and the load beam perform different functions, it is desirable that they have different mechanical properties. In particular, it is desirable that the spring area be more elastic or flexible than the load beam because a load beam that is too elastic will tend to bend and resonate in response to windage induced forces.

To solve this problem, the prior art has developed several techniques for forming a suspension so that the thickness of the spring area is less than the thickness of the load beam. In one technique, the spring area is partially etched to reduce its thickness. However, partial etching provides poor thickness control of the partially etched portions and results in poor pre-load stability in the spring area. A second technique welds a second metal sheet to the load beam. However, welding is costly and causes distortion of the load beam due to the heating of the metal. In addition, welding requires a minimum surface area that will not be present in smaller suspensions of the future.

A third technique taught by the art is to form the suspension through lamination. For example, U.S. Pat. No. 4,996,623 to Erpelding et al. discloses a suspension formed about a flat flexible material. In the base area and the load beam, the flat flexible material is bonded on both sides to patterned metal layers. However in the spring area, the flat flexible material is only bonded on one side to a metal layer. This makes the spring area more flexible than the base area and the load beam.

Although the spring area is more flexible than the load beam in Erpelding, it is still formed of two different material layers. In addition, the laminated structures of the past do not aid in the manufacture or installation of the suspension. In particular, the laminated structures of the past do not aid in rail formation, welding the suspension to a base plate, aligning the suspension with other pieces, attaching a flex electrical circuit to the suspension, or attaching micromotors such as piezo-electric elements to the suspension.

The present invention provides a solution to these and other problems, and offers other advantages over the prior art.

SUMMARY OF THE INVENTION

A laminated suspension includes recesses in one layer of the suspension that aid in attaching elements to the suspension and in utilizing a micromotor placed on the suspension. In particular, examples of the recesses include weld areas for welding the suspension to other items, fiducials that are used to align the suspension with other items, micromotor recesses that receive micromotors, adhesive controls that restrict the location of adhesives on the suspension, electrical interconnect attachment tabs that accept flex circuits, side rails that reduce torsional resonance during microactuation and microactuator hinges that reduce the force needed for microactuation. In addition, a laminated suspension with a single metal layer in the spring area is provided.

These and various other features as well as advantages which characterize embodiments of the present invention will be apparent upon reading the following detailed description and review of the associated drawings.

BRIEF DESCRIPTION OF THE DRAWINGS

FIGS. 5 and 6 are bottom and top views, respectively, of one embodiment of a suspension under the present invention with rails formed of a single sheet of material.

FIGS. 7 and 8 are bottom and top views, respectively, of an additional embodiment of a suspension under the present invention with electrical interconnect attachment tabs formed of a single sheet of material.

FIGS. 9 and 10 are bottom and top views, respectively, of an additional embodiment of a suspension under the present invention with weld holes formed in one sheet of material.

FIGS. 11 and 12 are bottom and top views, respectively, of an additional embodiment of a suspension under the present invention with a gimbal end formed of one sheet of material.

FIGS. 13 and 14 are bottom and top views, respectively, of an additional embodiment of a suspension under the present invention with micromotor wells formed in one sheet of material.

FIG. 15 is a bottom view of the suspension of FIG. 13 with micromotors attached to the suspension.

FIG. 16 is a top view of an additional embodiment of a suspension under the present invention with fiducials formed in one sheet of material.

DETAILED DESCRIPTION OF ILLUSTRATIVE EMBODIMENTS

Figure 1:
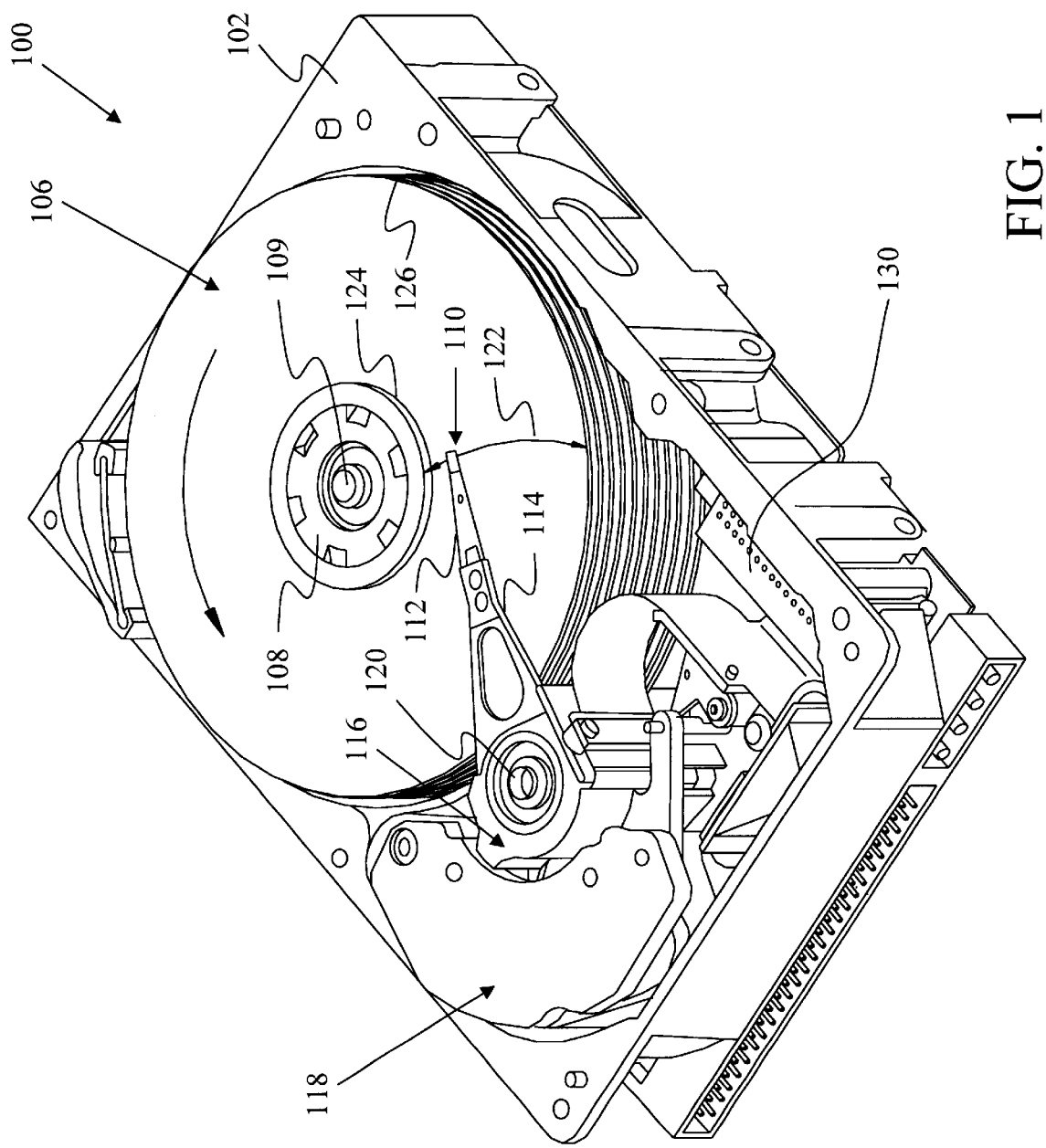
FIG. 1 is an isometric view of a disc drive in which embodiments of the present invention may be practiced.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle 109 by a disc clamp 108. Disc pack 106 includes a plurality of individual discs, which are co-rotated about spindle 109 by a spindle motor (not shown) attached to the bottom of spindle 109. Each disc surface has an associated disc head slider 110 which is mounted to disc drive 100 for communication with the disc surface. As the disc pack is rotated, it generates air circulation through the drive and in particular generates an air bearing between each head slider 110 and each disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 3:
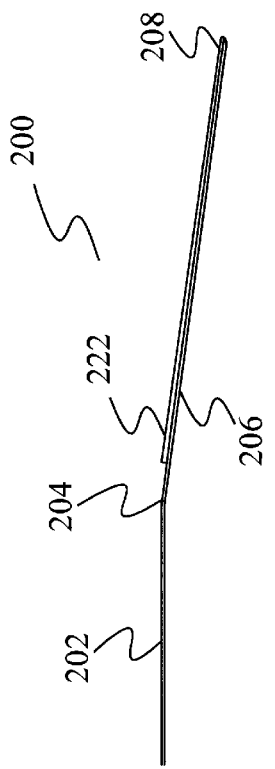
FIG. 3 is a side view of a suspension under the prior art.
Figure 2:
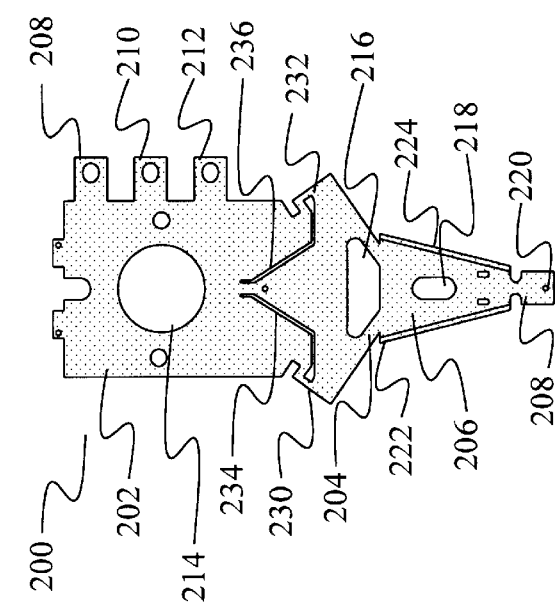
FIG. 2 is a top view of a suspension under the prior art.

FIGS. 2 and 3 provide a bottom view and a side view, respectively, of a suspension 200 of the prior art. Suspension 200 includes a base plate area 202, a spring area 204 and a load beam area 206.

Base plate area 202 is designed to be welded to a base plate (not shown) that is later swaged to an actuator arm. The base plate generally extends beneath the entire base plate area with a portion of the base plate extending through an opening 214 in the suspension. The base plate area also includes three electrical interconnect attachment tabs 208, 210, and 212, that extend to one side of the base plate area and that provide a structure to support a flex circuit. In general, the flex circuit is woven between the tabs such that it is above tabs 208 and 212 and below tab 210.

Spring area 204 is located between base plate area 202 and load beam 206. A gap 216 in spring area 204 is designed to reduce the stiffness of the spring area so that the spring area resiliently bends in response to aerodynamic lifting forces applied to the head.

Between spring area 204 and base plate area 202 are microactuator hinges 230 and 232 and microactuator gaps 234 and 236. Two respective micromotors (not shown) extend across microactuator gaps 234 and 236 and are able to move spring area 204 and load beam 206 based on electrical signals provided to the micromotors.

Load beam 206 extends from spring area 204 to a gimbal attachment portion 208, which attaches to a gimbal assembly (not show). Load beam 206 includes a tooling through hole 218 and a dimple 220 that provides a pivot point for the gimbal assembly. When the medium is moving, the gimbal assembly pitches and rolls about the pivot point in response to aerodynamic forces that are applied to the head. Load beam 206 also includes a pair of side rails 222 and 224 that are formed by bending the edges of the load beam upward.

Figure 4:
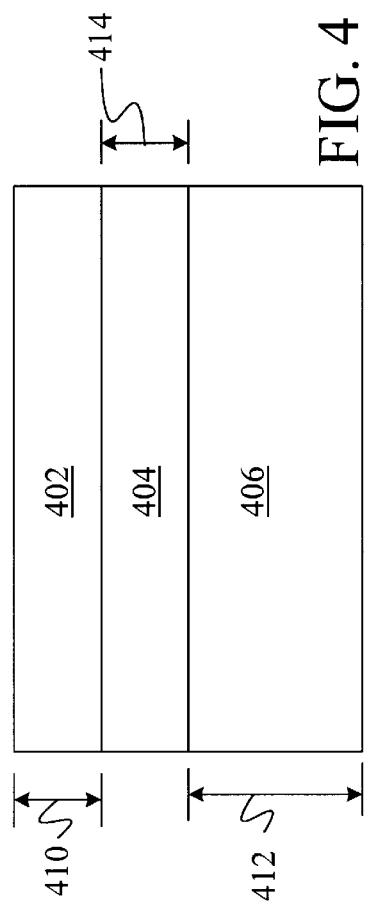
FIG. 4 is a cross section of one embodiment of a laminate structure used on suspensions of the present invention.

Under many aspects of the present invention, a laminated suspension is provided wherein material is removed from one of the laminate layers to aid in the production of the suspension and/or to aid in the microactuation of the suspension. FIG. 4 provides a cross section of one embodiment of a laminate structure under the present invention.

In FIG. 4, laminate structure 400 includes a thin top layer 402, an adhesive layer 404, and a thick bottom layer 406. In one embodiment, thin top layer 402 is formed from a stainless steal sheet having a thickness 410 of 30.5 $\mu$m. Under this embodiment, thick bottom layer 406 is also formed from a sheet of stainless steel and has a thickness 412 of 63.5 $\mu$m. The two stainless steal layers are bonded together by adhesive layer 404. In one embodiment, adhesive layer 404 is Rogers 1500 adhesive applied to a thickness 414 of 27 $\mu$m.

FIGS. 5–20 show various embodiments of the present invention in which a portion of one of the layers on the suspension is removed to aid in the production or installation of the suspension and/or in the microactuation of the suspension. In FIGS. 5–20, top layer 402 is depicted by diagonal hatching and bottom layer 406 is depicted by dot markings.

For example, FIGS. 5 and 6 provide bottom and top views of a suspension 520 having a base area 504, a spring area 506, and a load beam 508. In suspension 520 portions of thick bottom material 406 and adhesive 404 are removed so that two side rails 500 and 502 along the side of the load beam 508 are formed only from top layer 402. During construction of the suspension, the side rails are bent to form a 90 degree angle with the rest of the load beam. By forming the rails with one layer of material, the rails are easier to bend than if the rails were formed from both layers of the suspension. Using one layer for the rails also reduces the mass of the rails, which helps to push the torsional resonance frequencies of the load beam to higher levels. The reduced mass also makes microactuation of the load beam easier and as such, load beams formed from a single material are also referred to herein as microactuation recesses.

In other embodiments, merge wings are found in place of the two side rails. Like side rails 500 and 502, the merge wings are formed by top layer 402. However, instead of extending down the length of the load beam, the merge wings appear as two short tabs on each side of the load beam. By making the merge wings out of only one layer, they are easier to form and have less mass.

FIGS. 7 and 8 provide bottom and top views of an additional suspension embodiment 720 in which two electrical interconnect attachment tabs 700 and 702 are formed only from top layer 402. By removing bottom layer 406 and adhesive 404 from these two tabs, it is easier to weave the flex circuit between the electrical interconnect attachment tabs. In particular, the flex circuit does not have to be bent as much to fit under the bottom of tabs 700 and 702 while extending over the top of tab 704.

FIGS. 9 and 10 show bottom and top views of a suspension embodiment 920 in which weld recesses 900, 902, 904, 906, 908, and 910 have been formed in bottom layer 406 and adhesive layer 404. The weld recesses make it easier to weld laminated suspension 920 to a base plate because they provide direct access to the layer of material that is to be welded to the base plate. In general, this allows for a more direct application of the heat needed for welding and thus is more efficient. It also prevents damage to the laminate structure that would otherwise occur if heat or electrical current were applied to the adhesive.

FIGS. 11 and 12 provide bottom and top views of a suspension embodiment 1120 of the invention in which a gimbal attachment section 1100 of the load beam is formed only from top layer 402. By forming gimbal attachment section 1100 from only a single layer of material, it is easier to form dimple 1102 on the load beam and it is easier to weld the gimbal to the load beam.

FIGS. 13 and 14 provide bottom and top views, respectively, of a suspension embodiment 1320 in which micromotor recesses 1302 and 1304 have been formed in bottom layer 406 and adhesive layer 404. Recesses 1302 and 1304 each provide a space into which a micromotor may be placed. When inserted, the micromotors cross gaps 1302 and 1304, respectively, and are able to move the spring area relative to the base. FIG. 15 shows a bottom view of the suspension with micromotors 1502 and 1504 placed in recesses 1302 and 1304.

By inserting the micromotors into the recesses, the overall height of the suspension with the micromotors is reduced. This makes it easier to assemble the suspension into the disc drive when there is very little space between the discs in the disc stack. The recesses also aid in placing the micromotors in the proper location on the suspension which in turn improves microactuation of the suspension.

FIG. 16 provides a top view of a suspension embodiment 1620 in which fiducials 1600, 1602, 1604, 1606, and 1608 are formed in top layer 402 and adhesive 404 but not in bottom layer 406. The fiducials provide visual alignment features for attaching items such as the flex circuit, the slider and the micromotor to the suspension. By forming the fiducial in only one steel layer, the number of complete holes that pass through the suspension is reduced. This makes it easier to use vacuum-based clamps and pick-up tools to hold down and pick up the suspension during assembly.

Figure 18:
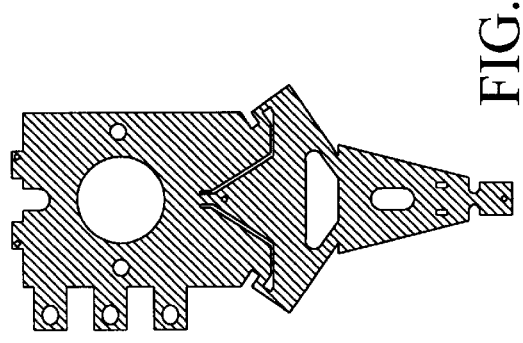
FIGS. 17 and 18 are bottom and top views, respectively, of an additional embodiment of a suspension under the present invention with adhesive control features formed in one sheet of material.
Figure 17:
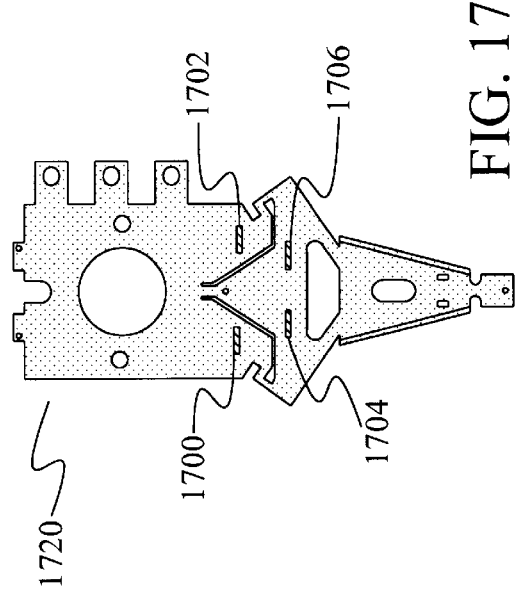

FIGS. 17 and 18 provide bottom and top views, respectively, of a suspension 1720 in which adhesive control features 1700, 1702, 1704, and 1706 are formed in bottom layer 406. These adhesive control features extend below micromotors (not shown) and help to restrict the location of adhesive used to bond the micromotors to the suspension. When used to aid in placing the micromotors, the adhesive control features are also referred to herein as microactuation recesses. Additional adhesive control features can be added to the suspension to restrict the location of adhesives used to bond other items, such as flex circuits, to the suspension.

Figure 20:
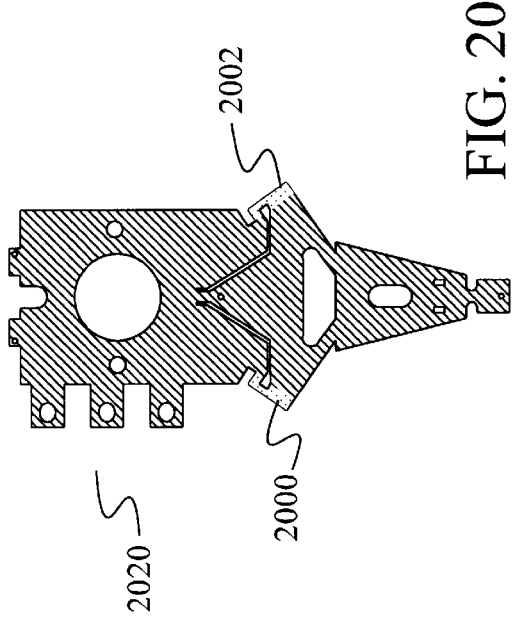
FIGS. 19 and 20 are bottom and top views, respectively, of an additional embodiment of a suspension under the present invention with microactuator hinges formed of one sheet of material.
Figure 19:
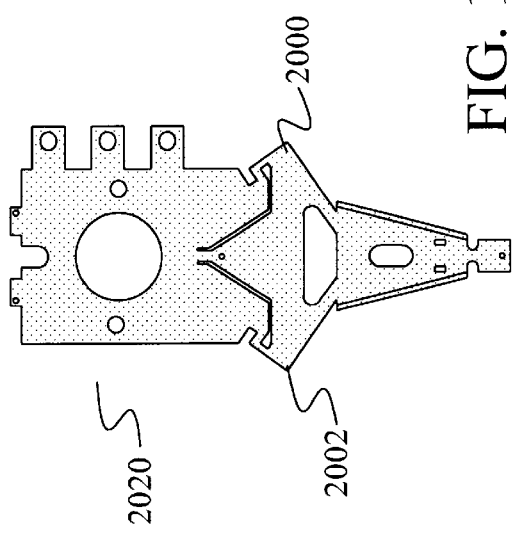

FIGS. 19 and 20 provide bottom and top views, respectively, of a suspension 2020 in which microactuator hinges 2000 and 2002 are formed only from bottom layer 406. By forming hinges 2000 and 2002 with only one sheet of metal, the hinges become more flexible than the remainder of the suspension, making it easier for the micromotors to move the load beam relative to the base plate.

Figure 22:
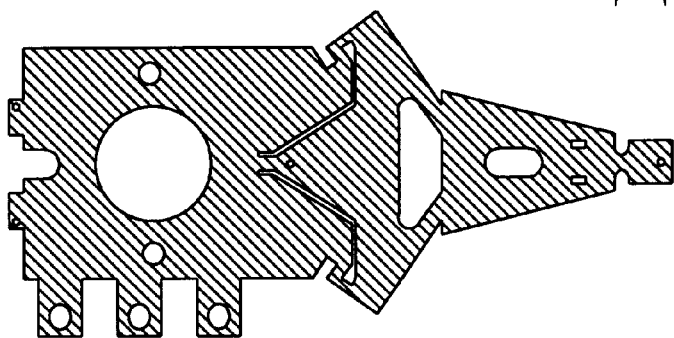
FIGS. 21 and 22 are bottom and top views, respectively of an additional embodiment of a laminated suspension under the present invention in which a spring area is formed of a single layer of material.
Figure 21:
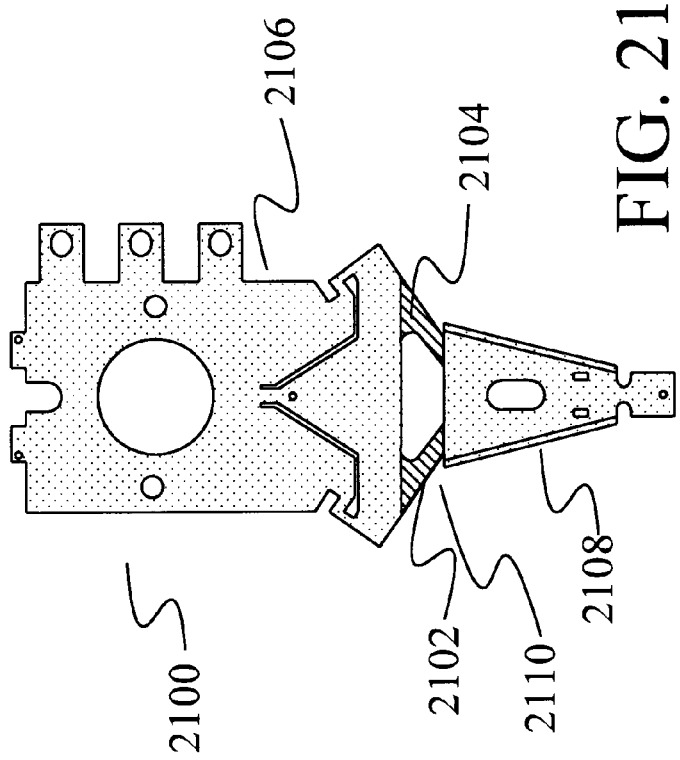

FIGS. 21 and 22 provide bottom and top views, respectively, of a suspension 2100 in which two arms 2102 and 2104 of a spring area 2110 are formed from only top layer 402 while base area 2106 and 2108 are formed from the laminate of top layer 402, adhesive layer 404 and bottom layer 406. In this embodiment, spring area 2110 is more flexible than base area 2106 and load beam 2108. In most such embodiments, adhesive layer 404 is chosen so that it has certain mechanical damping characteristics in the load beam and the base area. In particular, an adhesive that has better dampening properties than polyimide, such as Roger's 1500, is used in most such embodiments.

Although the features mentioned above are described as occurring in different embodiments, the present invention also includes combining two or more of the features in a single embodiment of the suspension.

Under one embodiment of the present invention, the suspension is formed by forming the two material layers separately using known stamping or cutting techniques such as laser precision cutting. Adhesive is then applied to one or both material layers and the two layers are aligned and brought together to form the laminated structure. The alignment and joining of the two layers can be performed by a "pick and place" robotic system such as the systems used in integrated circuit manufacturing.

Under a second embodiment, two sheets of material are bonded together to form a laminate. The entire laminate is then etched to form the general shape of the suspension. One layer of material (and the adhesive if there is any) is then selectively etched to form one or more of the features described above.

Although the present invention has been described above in connection with embodiments that use two stainless steal layers, the invention is not limited to these materials. In particular, one or both of the stainless steel layers may be replaced with another metal, such as copper, or a composite material such as a high performance plastic or metal matrix composite.

In summary, a data storage device (such as 100) for accessing data on a medium (such as 106) includes a laminated suspension (such as 520, 720, 920, 1120, 1320, 1620, 1720, 2020) that has a base area (such as 504), a spring area (such as 506), and a load beam (such as 508). The suspension also includes an attachment aid area (such as 700, 900, 1100, 1302, 1600, 1700) that is formed as a recess in a material layer (such as 402, 406) and aids in attachment of an item to the laminated suspension.

In other embodiments, a suspension (such as 520, 720, 920, 1120, 1320, 1620, 1720, 2020) includes a base (such as 504), a load beam (such as 508) and at least one micromotor (such as 1502, 1504) positioned between the base and the load beam. The suspension also includes at least one microactuation recess (such as 500, 1300, 1700, and 2000) that assists in the microactuation of the suspension.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension while maintaining substantially the same functionality without departing from the scope and spirit of the present invention. In addition, although the preferred embodiment described herein is directed to a suspension for a disc drive system, it will be appreciated by those skilled in the art that the teachings of the present invention can be applied to other systems, like tape drive systems, without departing from the scope and spirit of the present invention.

What is claimed is:

1. A data storage device for storing and accessing data in tracks on a medium, the storage device having a laminated suspension constructed of at least two material layers, the laminated suspension comprising:

a base area, a spring area;

a load beam; and an attachment aid area formed as a recess passing through the entire thickness of one of the material layers without passing through the entire thickness of the laminated structure, wherein the attachment aid area is located within one of the base area, spring area, or load beam and aids in the attachment of an item to the laminated suspension.

2. The data storage device of claim 1 wherein the attachment aid area is a Weld access area that provides access to a material layer that is to be welded to the item.

3. The data storage device of claim 2 wherein the weld access area is formed in the base area.

4. The data storage device of claim 2 wherein the weld access area is formed in a gimbal attachment portion of the load beam.

5. The data storage device of claim 1 wherein the attachment aid area is located on an electrical interconnect attachment tab portion of the base area and aids in attaching a flex circuit to the suspension.

6. The data storage device of claim 1 wherein the attachment aid area is a fiducial that is used to align the suspension relative to the item.

7. The data storage device of claim 1 wherein the attachment aid area is an adhesive control feature that restricts the location of adhesive used in bonding the item to the suspension.

8. The data storage device of claim 1 wherein the attachment aid area is a micromotor recess and the item is a micromotor and wherein the micromotor recess is sized to receive the micromotor.

9. The data storage device of claim 1 wherein the attachment aid area is a gimble dimple formation area located on the load beam.

10. A laminated suspension for a data storage device, the laminated suspension formed of at least two layers and comprising:

a base;

a load beam;

at least one micromotor positioned between the base and the load beam that is capable of moving the load beam relative to the base; and a microactuation recess passing through the entire thickness of one layer without passing through the entire thickness of the suspension that assists in microactuation of the suspension.

11. The suspension of claim 10 wherein the microactuation recess assists in microactuation by assisting in the attachment of the micromotor to the suspension.

12. The suspension of claim 11 wherein the microactuation recess comprises a micromotor recess that receives the micromotor.

13. The suspension of claim 11 wherein the microactuation recess comprises an adhesive control recess that restricts the location of adhesive used to bond the micromotor to the suspension.

14. The suspension of claim 10 wherein the microactuation recess comprises a microactuation hinge.

15. The suspension of claim 10 wherein the microactuation recess forms a side rail on the load beam.

16. A method of manufacturing a suspension for a disc drive, the method comprising:

bonding a first layer of material to a second layer of material;

removing a portion of the second layer of material to expose the first layer of material thereby defining an attachment aid area that aids in attaching an item to the suspension.

17. The method of claim 16 wherein defining an attachment aid area comprises defining a weld area.

18. The method of claim 16 wherein defining an attachment aid area comprises defining a fiducial.

19. The method of claim 16 wherein defining an attachment aid area comprises defining an adhesive control area.

20. The method of claim 16 wherein defining an attachment aid area comprises defining a micromotor receiving area.

21. The method of claim 16 wherein defining an attachment aid area comprises defining a flex circuit receiving area.

22. A disc drive for storing data on a disc, the disc drive comprising:

a laminated suspension having a base area, a load beam and a micromotor positioned between the base area and the load beam; and microactuation means for assisting in microactuation of the load beam relative to the base area, the microactuation means formed as a recess passing through the entire thickness of one layer without passing through the entire thickness of the laminated suspension.

23. The disc drive of claim 22 wherein the microactuation means comprises a recess that receives the micromotor.

24. The disc drive of claim 22 wherein the microactuation means comprises an adhesive control recess that restricts the location of adhesive used to bond the micromotor to the suspension.

25. The disc drive of claim 22 wherein the microactuation means comprises a hinge formed of a single layer of the suspension.

26. A data storage device for storing and accessing data in tracks on a medium, the storage device having a suspension comprising:

a base area formed of a first metal layer bonded to a second metal layer by an adhesive;

a spring area formed of only a single metal layer; and a load beam formed of a first metal layer bonded to a second metal layer by an adhesive.

27. The data storage device of claim 26 wherein the adhesive in the base area and the load beam provides better damping than a polymide of equal thickness.

28. The data storage device of claim 26 wherein the second metal layer of the base area, the second metal layer of the load beam and the single metal layer of the spring area form a continuous metal layer.

29. The data storage device of claim 28 wherein the first metal layer of the base area and the first metal layer of the load beam are thicker than continuous metal layer.

* * * * *